United States Patent
Sakaguchi et al.

(10) Patent No.: US 6,523,735 B2
(45) Date of Patent: Feb. 25, 2003

(54) METHOD OF MANUFACTURING BONDED ASSEMBLY

(75) Inventors: Koichi Sakaguchi, Osaka (JP); Shinjiro Domi, Osaka (JP); Shigeki Nakagaki, Osaka (JP); Yoshikazu Toshikiyo, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/957,575

(22) Filed: Sep. 20, 2001

(65) Prior Publication Data

US 2002/0036226 A1 Mar. 28, 2002

(30) Foreign Application Priority Data

Sep. 22, 2000 (JP) .......................... 2000-288863

(51) Int. Cl.$^7$ ............................................. B23K 31/02
(52) U.S. Cl. ...................... 228/122.1; 228/172; 228/259
(58) Field of Search ................ 228/122.1, 124.1–124.5, 228/172–259; 428/450, 432

(56) References Cited

U.S. PATENT DOCUMENTS

| | | | |
|---|---|---|---|
| 3,718,172 A | * | 2/1973 | Rice et al. .................... 164/75 |
| 4,333,813 A | * | 6/1982 | Kaplan et al. ........... 204/247.3 |
| 4,946,090 A | | 8/1990 | Hepburn |
| 5,143,541 A | * | 9/1992 | Sugitani ...................... 75/338 |
| 5,342,492 A | * | 8/1994 | Sekhar ........................ 205/384 |
| 5,571,440 A | * | 11/1996 | Eckert ......................... 222/594 |
| 5,993,976 A | * | 11/1999 | Sahoo et al. ................ 428/472 |
| 6,140,743 A | * | 10/2000 | Kishima et al. ............ 310/330 |
| 6,183,875 B1 | * | 2/2001 | Ning et al. .................. 428/472 |

* cited by examiner

*Primary Examiner*—Tom Dunn
*Assistant Examiner*—Jonathan Johnson
(74) *Attorney, Agent, or Firm*—Fulbright & Jaworski L.L.P.

(57) ABSTRACT

A method of bonding respective objects made of different kinds of material to each other is disclosed. The method includes the steps of (A) contacting a bonding material in the fluid state thereof with respective bonding faces of the respective objects to be bonded, (B) mechanically abrading portions of the respective bonding faces contacting the bonding material to be bonded to each other, (C) setting the respective objects fixed in a predetermined position relative to each other while maintaining the respective objects in contact with the bonding material in the fluid state thereof, and (D) solidifying the bonding material to bond the respective objects to each other. In the respective steps (A)–(D), the bonding material is present at the bonding portions to be bonded to each other of the respective objects constantly and without discontinuities.

6 Claims, 6 Drawing Sheets

METHOD OF MANUFACTURING BONDED ASSEMBLY

BACKGROUND OF THE INVENTION

1. Field of the Invention

The present invention relates to a method of manufacturing a bonded assembly, in particularly, a bonded assembly of glass, ceramics and a metal.

2. Description of the Related Art

Conventionally, as the art of bonding different kinds of material such as metal, ceramics and glass, there are known such methods as brazing, tin-alloy hard soldering, etc.

For bonding ceramics and metal by means of brazing, a material is required which is capable of bonding these. As such material, there is known active braze, i.e. Ti—Ag—Cu alloy, which can be wetted, in a molten state thereof, with ceramics.

For bonding between glass and metal, it has been conventional to employ a tin alloy with a component such as Zn having a high affinity relative to oxygen. In such case, the bonding is obtained by placing the tin alloy in its molten state with glass and metal with application of ultrasonic wave thereto.

An alternative method is known as metallizing method, according to which a metal layer is formed on the surface of ceramics and bonding is done with using a solder material made of metal.

With the above-described conventional methods, however, it has been difficult to bond plate-like bonding objects (i.e. objects to be bonded together) via only predetermined portions thereof with a predetermined constant gap and in a flawless condition. For instance, when an active braze is employed, it is needed to heat this solder material while applying a pressure to this material as being firmly held between the bonding objects. However, it has not been possible to always obtain an ideal condition in which the bonding portions are placed in gapless and tight contact with each other over the entire areas thereof. Further, with the bonding method using application of ultrasonic wave too, it has been difficult to form the bonding portions into a planar shape.

The present invention has been devised to overcome the above-described drawbacks of the conventional art. A primary object of the invention is to provide a method of bonding predetermined portions of objects efficiently and in a firmly contacted condition, in particular, such method allowing bonding flat plate-like objects without voids therebetween.

SUMMARY OF THE INVENON

For accomplishing the above-noted object, the invention proposes a method of bonding respective objects made of different kinds of material to each other, the method comprises the steps of:

(A) contacting a bonding material in the fluid state thereof with respective bonding faces of the respective objects to be bonded;

(B) mechanically abrading portions of the respective bonding faces contacting the bonding material to be bonded to each other;

(C) setting the respective objects fixed in a predetermined position relative to each other while maintaining the respective objects in contact with the bonding material in the fluid state thereof; and (D) solidifying the bonding material to bond the respective objects to each other;

characterized in that in the respective steps (A)–(D), the bonding material is present at the bonding portions to be bonded to each other of the respective objects constantly and without discontinuities.

In the above, what is referred to herein as "a bonding material in the fluid state thereof" represents e.g. a bonding material having such viscosity as allows the objects to be submerged therein, the viscosity being generally $10^4$ Pa.s or less. Specific examples of the material includes resin, molten glass, molten salt, molten metal, etc. These materials which are fluidized by heating and are in the form of solids at the normal temperature can be used as the bonding material in the present invention.

Further, the step of "mechanically abrading" comprises activating means for forming bonding between the fluidized bonding material and the bonding surface portion of the object to be bonded. In particular, when the objects and the bonding material are of different kinds of material, because of the difference between the bonding structures of the materials, this activating means becomes essential. A typical example is a case when the bonding object is an oxide ceramics and the fluidized bonding material is a molten metal. Although the exact mechanism by which the mechanical abrasion promotes bonding between different kinds of materials is not known, it is believed that the energy by abrasion helps to break the energy barrier existing in the transformation of the bonding of the respective materials per se to the bonding between the materials.

Also, in the meaning of the present invention, the condition "the bonding material is present at the bonding portions of the respective objects constantly and without discontinuities." refers to the gaplessness or continuity in the bonding material in the course of movement thereof from the bonding portion of one object to the bonding portion of the other object. With this, when the objects are set at a predetermined position for allowing them to be finished as a bonded assembly, no voids are formed in the bonded portions thereof. If any void is present in the bonded portions, this result in disadvantageous reduction in the bonding strength and/or durability of the assembly. Therefore, this condition is important for obtaining a bonded assembly having a high bonding strength and durability.

When the bonding portions of the invention are to be used as air-tight sealing portions, the above condition is suitable as it assures voidless bonded condition.

That is, such condition of gap or void absent the bonding material being present between the bonding portions of different parts is out of the scope of the present invention. An example of this is a case when the bonding material is applied separately to each bonding portion and then these bonding portions are joined and bonded together. In such case, the object surface applied with the bonding material is inevitably exposed to the atmosphere in the course of the process to be rendered into a portion of a different property. More particularly, in case the bonding material is a molten metal, the exposure leads to generation of an oxide film thereon, and this film becoming the different-property portion. When the bonding faces are joined, such different-property portions tend to formation of voids, being not suitable as a bonded condition, even more unsuitable if they are used as air-tight sealing portions.

Preferably, the bonding material in the fluid state thereof comprises a molten metal, which includes a contact portion to be contacted to the atmosphere and a non-contact portion not to be contacted to the atmosphere, the non-contact portion of the molten metal being placed into contact with the contacting portions of the respective objects.

Metal material experiences elastic deformation and plastic deformation. Hence, it is possible to reduce stress generated in the bonding interface. So, metal material is advantageous with respect to the strength and durability of the bonding portions. On the other hand, with metal material, if exposed to oxygen-containing atmosphere in the molten state of the material, the material gradually experiences oxidation. In an inactive gas atmosphere or depressurized atmosphere, the progress of oxidation may be restricted to some extent. In practice, it is difficult to avoid oxidation for those metals having high affinty to oxygen, unless they are placed under a strongly reducing condition. It is desired for the purpose of obtaining greater strength and durability that the bonding portions be devoid of any oxides resulting from oxidation of molten metal employed as the bonding material. For this reason, it is preferred that in the bonding process, the molten metal to be placed into contact with the bonding portion of each object comprise the non-contact portion of the molten metal not exposed to the atmosphere, thus devoid of oxides.

Incidentally, a metal component having high affinity to oxygen can provide strong bonding in bonding to an oxide material in particular. Hence, it is preferred that the bonding material include such metal component. Moreover, in such case, if the metal material forming the bonding material contains oxygen, this sometimes can promote formation of bonding to the objects. For these reasons, it is preferred that the molten metal the molten metal employed as the bonding material be capable of taking in an appropriate amount of oxygen when exposed to the atmosphere and the non-contact portion of the molten metal not exposed to the atmosphere and devoid of oxides come into contact with the bonding portion.

Further, according to the present invention, preferably said steps (A)–(C) are effected at one time. An example of this is that the non-contact portion of the fluidized bonding material not exposed to the atmosphere is introduced to contact the bonding portions while the mechanical abrasion is applied to these portions simultaneously. With this, it is possible to manufacture a bonded assembly without any voids in an efficient manner.

Further and other features and advantages of the present invention will become apparent from the following detailed description with reference to the accompanying drawings.

DESCRIPTIOIN OF THE PREFERRED EMBODIMENTS

Preferred embodiments of the present invention will be described next with reference to the accompanying drawings.

FIGS. 1(a)–(d) illustrate respective steps of a bonding method relating to a first embodiment of the invention for round bars of ceramics are bonded together by the invention. Two objects 1A, 1B to be bonded are round ceramics bars of an equal diameter. A molten metal 2 employed as a bonding material is held inside a molten metal vessel 3. By submerging the objects 1A, 1B into the molten metal 2, end faces 1AS, 1BS of the round bars as bonding portions are placed into contact with the molten metal 2 as the bonding material. This process corresponds to step (A) recited in the appended claim 1.

Referring next to FIG. 1(b), while the round-bar end face 1AS as the contacting portion is kept in contact with the molten metal 2, this face is subjected to mechanical abrasion by a metal brush 5 (made of e.g. stainless steel), which abrasion causes activation between the round-bar end face 1AS and the molten metal 2. For the other object 1B too, the round-bar end faces 1AB as its bonding portion is subjected to mechanical abrasion of the metal brush 5 made of stainless steel or the like, to be activated thereby. These correspond to step (B) recited in the appended claim 1.

In FIG. 1(c), the objects 1A, 1B whose round-bar end faces 1AS, 1BS as the bonding portions having been activated by the mechanical abrasion respectively are brought closer to each other while allowing constant presence of the molten metal 2 between the end faces 1AS, 1BS and eventually placed into contact with each other without face displacement therebetween. These correspond to step (C) of claim 1.

Referring next to FIG. 1(d), the objects 1A, 1B are gradually lifted up through and eventually away from the molten metal 2 while keeping the round-bar end faces 1AS, 1BS in close contact with each other in the molten metal 2. Then, when the molten metal 2, i.e. the bonding material, held at the space between the round-bar end faces 1AS, 1BS is solidified by cooling, the bonding is completed, whereby a bonded assembly is obtained. This process corresponds to step (D) of claim 1.

The excess molten metal adhering to the other portions than the bonding portions of the finished bonded assembly can be readily moved by an appropriate mechanical force since those other portions did not experience the activation of the interface between the metal and the ceramics and therefore provide only weak force of adhesion.

FIGS. 2(a)–(d) illustrate respective steps of a further method relating to a second embodiment of the invention designed for bonding two ceramics plates together.

In FIG. 2(a), objects 6A, 6B are ceramics plates of equal dimensions. A molten metal 2 employed as a bonding material is held inside a molten metal vessel 3. By submerging the objects 6A, 6B into the molten metal 2, side faces 6AS, 6BS of the round bars as bonding portions are placed into contact with the molten metal 2 as the bonding material. This process corresponds to step (A) recited in the appended claim 1.

Referring next to FIG. 2(b), while the one side face 6AS as the contacting portion is kept in contact with the molten metal 2, this face is subjected to mechanical abrasion by a metal brush 5 (made of e.g. stainless steel), which abrasion causes activation between the side face 6AS and the molten metal 2. For the other object 6B too, the one side faces 6AB as its bonding portion is subjected to mechanical abrasion of the metal brush 5, to be activated thereby. These correspond to step (13) recited in the appended claim 1.

In FIG. 2(c), the objects 6A, 6B whose one side faces 6AS, 6BS as the bonding portions having been activated by the mechanical abrasion respectively are brought closer to each other while allowing constant presence of the molten metal 2 between the side faces 6AS, 6BS and eventually placed into contact with each other without face displacement therebetween. These correspond to step (C) of claim 1.

Referring next to FIG. 2(d), the objects 6A, 6B are gradually lifted up through and eventually away from the molten metal 2 while keeping the one side faces 6AS, 6BS in close contact with each other in the molten metal 2. Then, when the molten metal 2, i.e. the bonding material, held at the space between the side faces 6AS, 6BS is solidified by cooling, the bonding is completed, whereby a bonded assembly is obtained. This process corresponds to step (D) of claim 1.

The excess molten metal adhering to the other portions than the bonding portions of the finished bonded assembly can be readily moved by an appropriate mechanical force since those other portions did not experience the activation of the interface between the metal and the ceramics and therefore provide only weak force of adhesion.

FIGS. 3(a)–(c) illustrate respective steps of a method according to a third embodiment of the present invention for bonding portions of the ceramics plates 6A, 6B together. In this case, the process is substantially the same as that described above with reference to FIG. 2 for bonding the ceramics plates 6A, 6B. In this case, however, since only portions of the one side faces 6AS, 6BS of the plates 6A, 6B are to be bonded, only those limited bonding portions are subjected to the mechanical abrasion (see FIG. 3(a)). Then, as illustrated in FIG. 3(b), while the plates 6A, 6B are kept submerged in the molten metal 2, the plates are brought closer to each other while always keeping the molten metal 2 between the respective bonding portions thereof and eventually into contact with each other. As these plates kept in contact with each other are gradually lifted up from the molten metal 2 and then cooled for solidification, whereby the bonding is completed and a bonded assembly is obtained (FIG. 3(c)).

Figure 1:
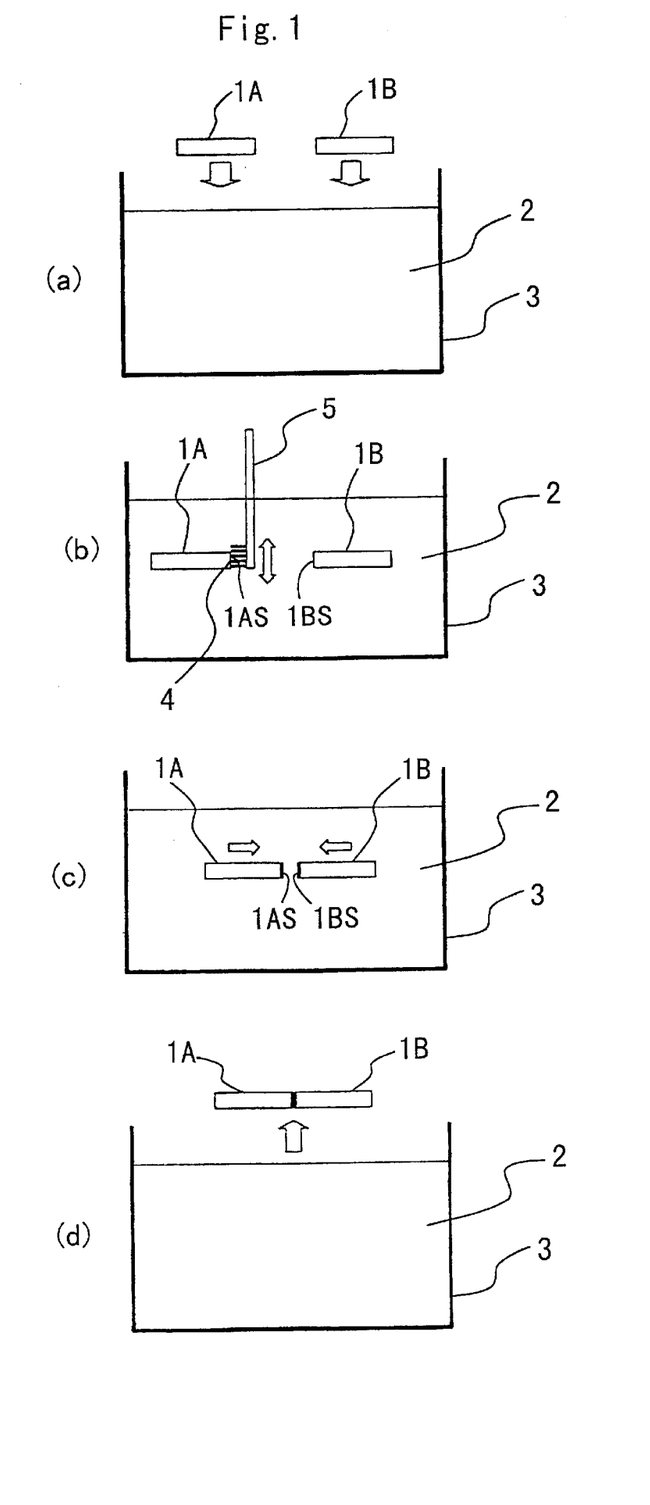
FIGS. 1(a)–(d) are partial side views showing an embodiment of the present invention.
Figure 2:
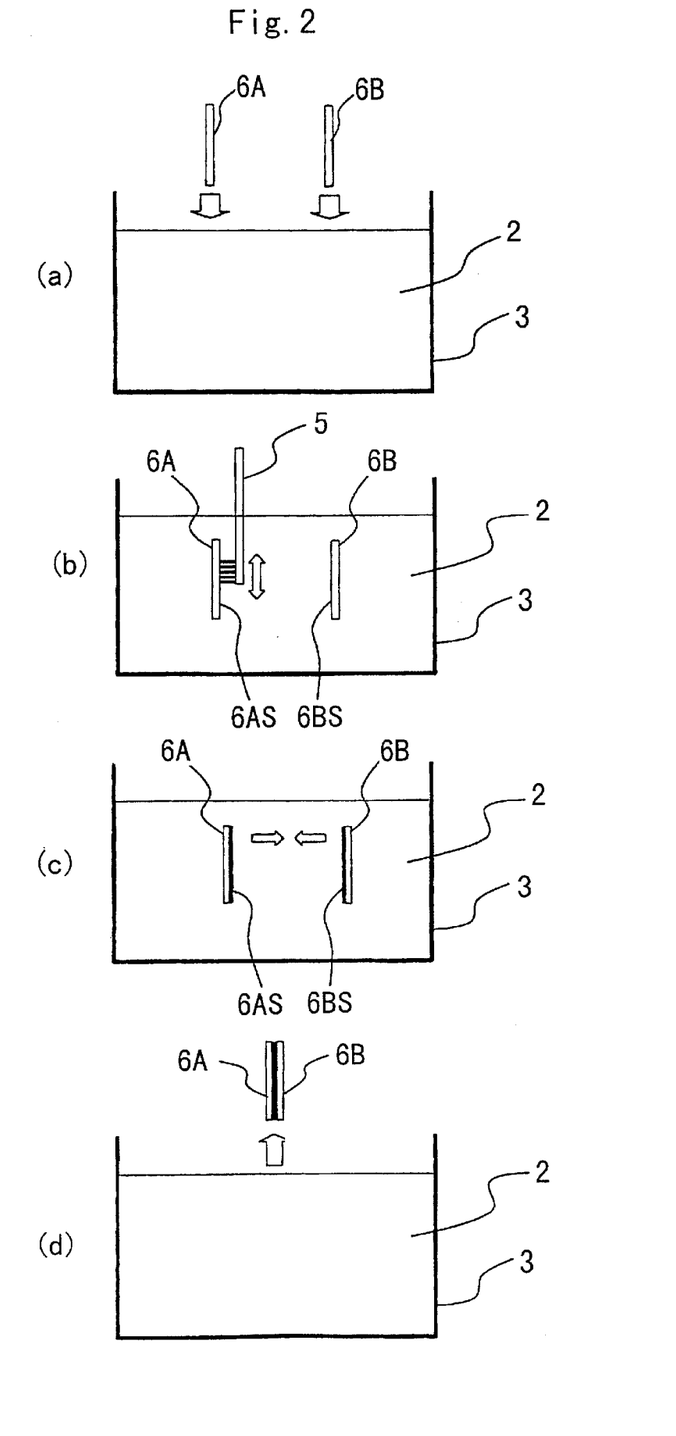
FIGS. 2(a)–(d) are partial side views showing a further embodiment of the present invention.
Figure 3:
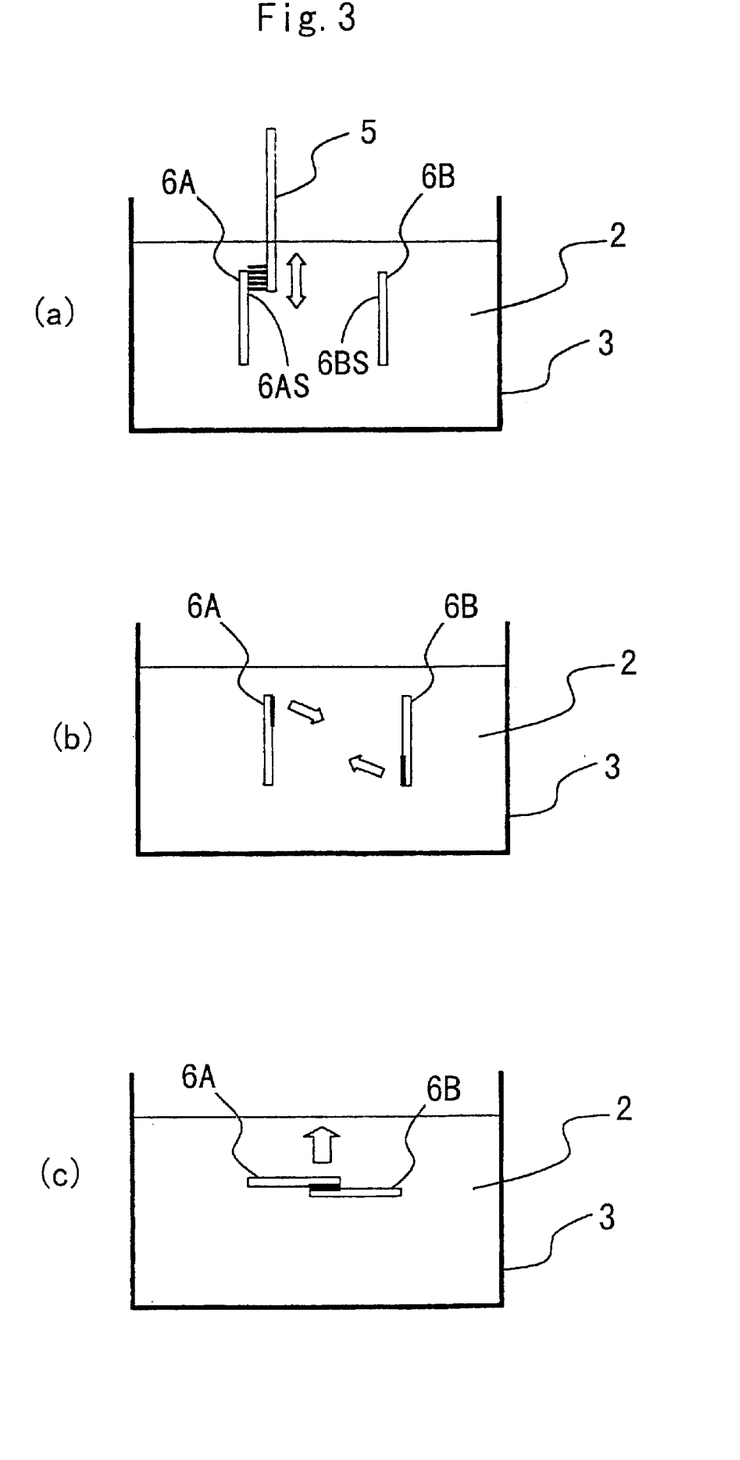
FIGS. 3(a)–(c) are partial side views showing a still further embodiment of the present invention.

Incidentally, in the finished bonded assembly, the excess molten metal adhering to the other portions than the bonding portions can be readily moved by appropriate mechanical force, just like the case of FIG. 2 described above.

Figure 4:
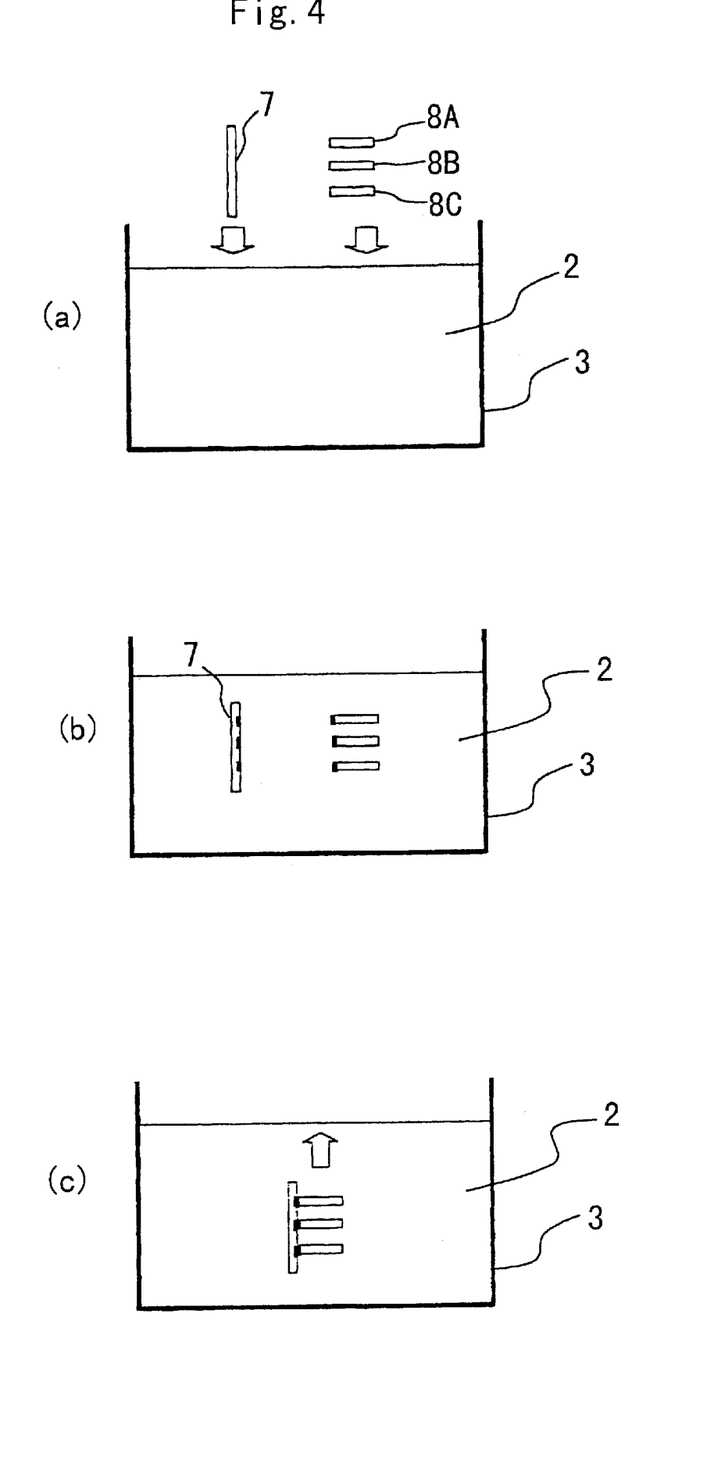
FIGS. 4(a)–(c) are partial side views showing a still further embodiment of the present invention.

FIGS. 4(a)–(c) illustrate respective steps of a method relating to a fourth embodiment of the present invention for bonding plates 8A, 8B, 8C to a plate 7. In FIG. 4(a), the plates 7 and the plates 8A–8C as objects to be bonded together all are made of ceramics. In this method, end faces of the plates 8A–8C are to be bonded to the face of the plate 7. The molten metal 2 used as the bonding material is contained in the molten metal tank 3. By submerging the plate 7 and the plates 8A–8C as the objects to be bonded into the molten metal 2, the molten metal 2 as the bonding material is brought into contact with all of the respective bonding portions. This process corresponds to step (A) in claim 1.

FIG. 4(b) illustrates a condition in which the respective bonding portions while kept in contact with the molten metal 2 are subjected to the mechanical abrasion (for clarity of the illustration, the metal brush 5 is not shown in this figure). This process corresponds to step (B) of claim 1. If the end face, i.e. the bonding portion, of the respective plates 8A–8C, or the corresponding bonding portion of the plate 7 is small in area or narrow, the metal brush 5 should be formed correspondingly smaller or abrasion should be provided instead by a leading end of a plate or the like, so as to cope with the shape and dimensions of the bonding portion.

In FIG. 4(c), the objects with their bonding portions activated by the mechanical abrasion are kept submerged in the molten metal 2 and under this condition, they are brought closer to each other with constantly keeping the molten metal 2 between the respective bonding portions thereof and eventually brought into contact with each other. This process corresponds to step (C) of claim 1.

From this condition, the plate 7 and the plates 8A–8C are lifted up away from the molten metal 2 while keeping the dose contact between the respective bonding portions in the molten metal 2. When the molten metal 2 as the bonding material is solidified by cooling, the bonding is completed, whereby a bonded assembly is obtained. This process corresponds to step (D) of claim 1.

In the finished bonded assembly, the excess molten metal adhering to the other portions than the bonding portions can be readily moved by appropriate mechanical force, just like those cases described above.

Figure 5:
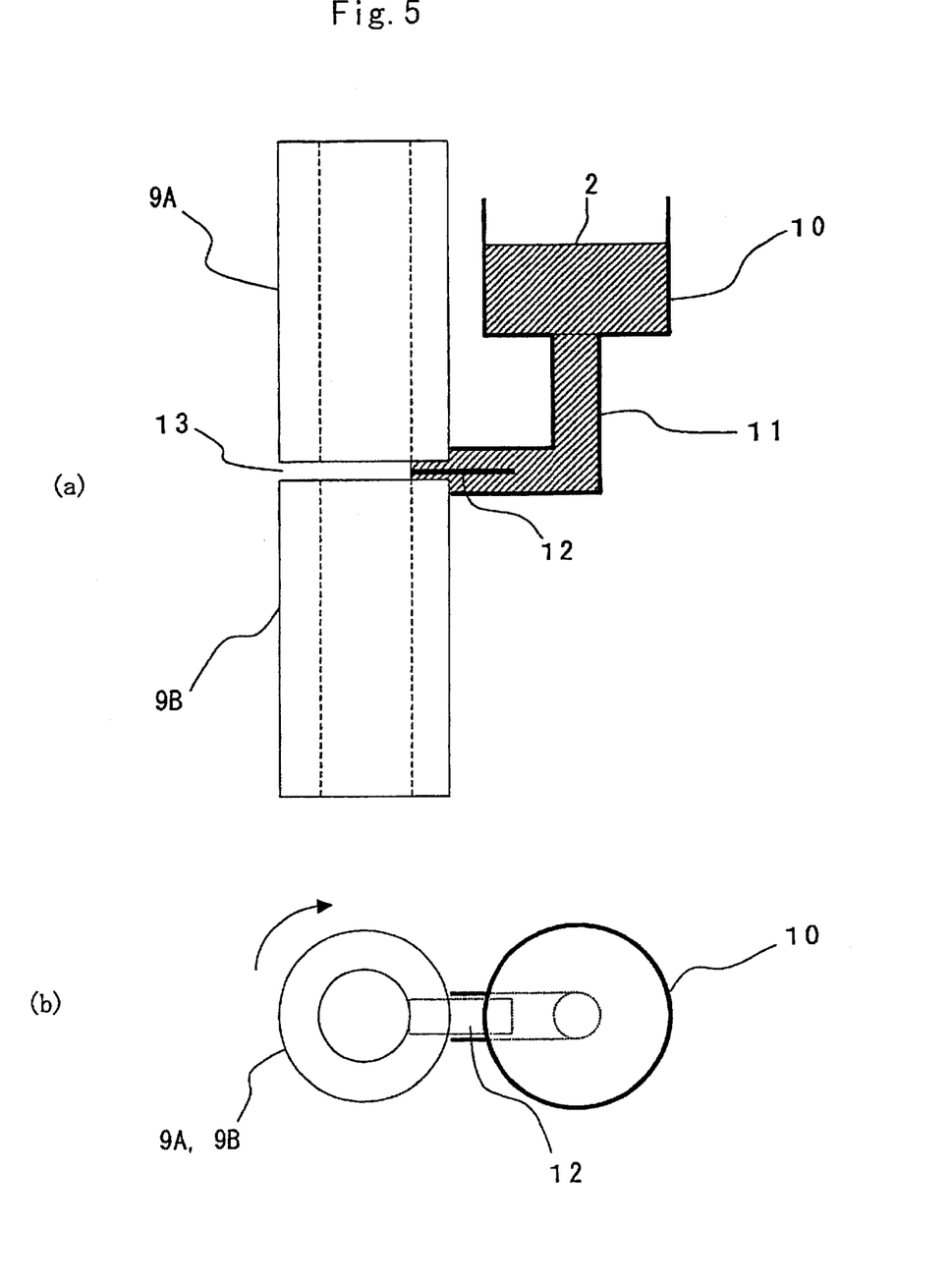
FIGS. 5(a)–(b) are a partial side view and a plan view illustrating a bonding method relating to a still further embodiment of the present invention.

FIGS. 5(a)–(b) illustrate respective steps of a method relating to a fifth embodiment of the present invention for bonding glass tubes together at their end faces. FIG. 5(a) is a side view. In this FIG. 5(a), marks 9A, 9B denote the glass tubes. These glass tubes 9A, 9B are arranged with a predetermined gap 13 maintained between the respective end faces thereof.

To this gap 13, a pipe 11 in the form of an elbow extends from a bottom of a molten metal tank 10. This pipe 11 includes a horizontally extending free end, into which a rectangular metal plate 12 is inserted, with a portion of the metal plate 12 projecting from the free end of the pipe 11 to the outside. The metal plate 12 has a plate thickness which is slightly smaller than the gap 11. In operation, the metal plate 12 is inserted into the gap 13 between the glass tubes 9A, 9B. Then, while keeping the end face of the pipe 11 in contact against the surfaces of the glass tubes 9A, 9B, the two glass tubes 9A, 9B are rotated together without mutual displacement between these glass tubes 9A, 9B, whereby the molten metal 2 is gradually filled along the entire periphery of the end faces of the glass tubes 9A, 9B.

FIG. 5(b) is a plan view illustrating the above-described filing process. Incidentally, the metal plate 12 is provided with unevenness (not shown) so as to cause friction or abrasion between the respective end face of the glass tubes 9A, 9B and this metal plate 12 during the filling process of the molten metal 2. Thereafter, when the assembly is cooled to the normal temperature, the bonding of the gap 13 is completed with the metal acting as the bonding material. This process is provided for effecting the steps (A)–(C) at one time and corresponds to a method recited in the appended claim 3.

The bonding methods described above with reference to FIGS. 1–5 all comprise the steps (A)–(D) recited in claim 1. And, in these methods, the presence of the bonding material at the bonding portions is constantly maintained throughout the process and no discontinuities are present at these bonding portions.

Further, in all of these bonding methods, the molten metal 2 is reserved within the molten metal tank 3, so that the surface of the molten metal is exposed to the atmosphere while the inner portion thereof is not exposed to the same, and this non-contact portion of the molten material not exposed to the atmosphere is employed for bonding of the objects.

Also, the bonding method described above with reference to FIG. 5 is constructed to effect the steps (A)–(C) of claim 1 at one time and this method is encompassed within the scope of the appended claim 3.

Figure 6:
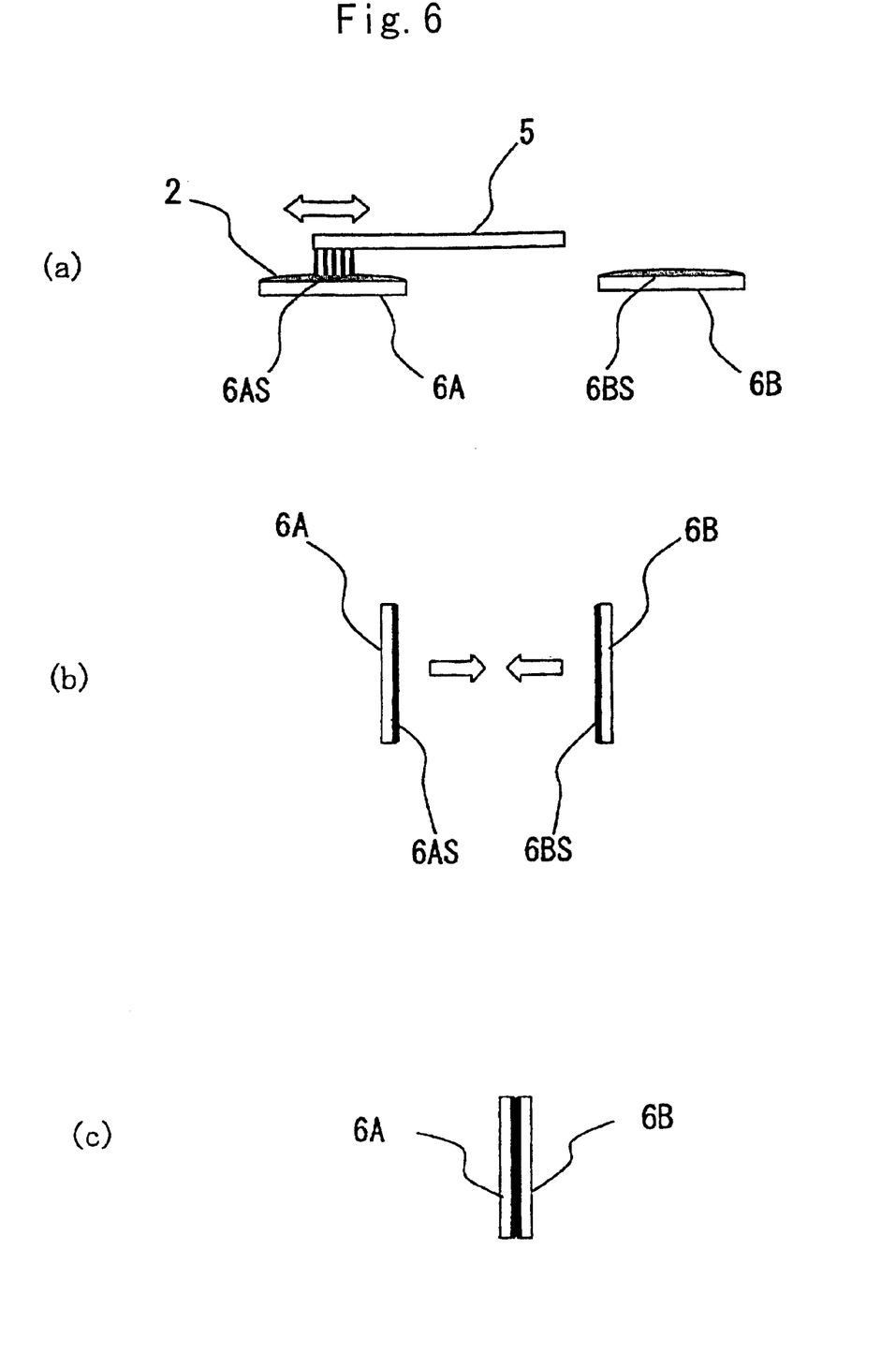
FIGS. 6(a)–(c) are partial side views showing a comparison example to be compared with the present invention.

FIG. 6 is an explanatory figure of a comparison example used as a reference in the explanation of the present invention. This example shows a technique out of the scope of the present invention. In FIG. 6(a), objects 6A, 6B are ceramics plates of equal dimensions. In this method, the objects 6A, 8B are heated in advance in an appropriate atmosphere. Then, the molten metal 2 as the bonding material is caused to flow onto the one side faces 6AS, 6BS of the plates as their bonding portions. Thereafter, these side faces 6AS, 6BS are abraded by the metal brush 5 over the entire areas thereof, so that a thin layer of the molten metal 2 is formed extensively to adhere to each bonding face. Next, as illustrated in FIGS. 6(b) and (c), the objects under the heated condition are brought into contact with each other at the bonding portions or faces thereof and then cooled for solidifying the metal.

With this method, there exist discontinuities of the bonding material at the respective bonding portions. Thus, this methodis out of the scope of the present invention as claimed in claim 1.

Next, some specific examples of the invention will be described.

EXAMPLE 1

As objects to be bonded together, two round bars of alumina each having a diameter of 10 mm and a length of 100 mm were prepared. Metal aluminum was employed as the bonding material. Then, this aluminum as the bonding material was charged into a melting basin and heated therein to 720° C. and maintained at this temperature so as to keep the material in the molten state thereof. Under this condition, the two alumina round bars were submerged into the molten aluminum and under this submerged condition, one of opposing end faces of each alumina round bar was subjected over the entire area thereof to mechanical abrasion by a metal brush. Thereafter, still under the submerged condition, the end faces of the bars were moved closer to each other and eventually contacted each other. While keeping this contact condition, the alumina round bars were lifted up away from the molten aluminum and then allowed to be cooled naturally, whereby the aluminum was solidified and a strongly bonded assembly was obtained.

The excess aluminum adhering to the other portions of the bars than the end faces thereof as the bonding portions was removed by peeling after the cooling. All of these steps were carried out in the atmosphere. Also, in the course of the above process, the respective end faces as the bonding portions of the two alumina round bars as the objects were kept submerged in the molten aluminum after they were first submerged therein until they were brought into contact with each other and no discontinuities of the molten aluminum as the bonding material were formed in the end faces until completion of the entire bonding process. This example corresponds to the first embodiment of the invention described hereinbefore with reference to FIGS. 1(a)–(d).

For confirmation, the bonded portions of the resultant bonded assembly was cut to reveal its section. Visual inspections of this section under an optical microscope as well as scanning electron microscope revealed very dense structure without voids therein.

EXAMPLE 2

As objects to be bonded together, two plates of alumina each having a thickness of 1 mm and dimensions of 40 mm×50 mm were prepared. Metal aluminum was employed as the bonding material. Then, this aluminum as the bonding material was charged into a melting basin and heated therein to 720° C. and maintained at this temperature so as to keep the material in the molten state thereof. Under this condition, the two alumina plates were submerged into the molten aluminum and under this submerged condition, one of opposing side faces of each alumina plate was subjected over the entire area thereof to mechanical abrasion by a metal brush. Thereafter, still under the submerged condition, the side faces of the plates were moved closer to each other and eventually contacted each other. While keeping this contact condition, the alumina plates were lifted up away from the molten aluminum and then allowed to be cooled naturally, whereby the aluminum was solidified and a strongly bonded assembly was obtained.

The excess aluminum adhering to the other portions of the plates than the side faces thereof as the bonding portions was removed by peeling after the cooling. All of these steps were carried out in the atmosphere. Also, in the course of the above process, the respective side faces as the bonding portions of the two alumina plates as the objects were kept submerged in the molten aluminum after they were first submerged therein until they were brought into contact with each other and no discontinuities of the molten aluminum as the bonding material were formed in the end faces until completion of the entire bonding process. This example corresponds to the second embodiment of the invention described hereinbefore with reference to FIGS. 2(a)–(d).

For confirmation, the bonded portions of the resultant bonded assembly was cut to reveal its section. Visual inspections of this section under an optical microscope as well as scanning electron microscope revealed very dense structure without voids therein.

EXAMPLE 3

As objects to be bonded together, two plates of alumina each having a thickness of 1 mm and dimensions of 40 mm×50 mm were prepared. Metal aluminum was employed as the bonding material. Then, this aluminum as the bonding material was charged into a melting basin and heated therein to 720° C. and maintained at this temperature so as to keep the material in the molten state thereof. Under this condition, the two alumina plates were submerged into the molten aluminum and under this submerged condition, a 10 mm width portion from the 40 mm side of one of opposing side faces of each alumina plate was subjected over the entire area thereof to mechanical abrasion by a metal brush. Thereafter, still under the submerged condition, the side faces of the plates were moved closer to each other and eventually contacted each other. While keeping this contact condition, the alumina plates were lifted up away from the molten aluminum and then allowed to be cooled naturally, whereby the aluminum was solidified and a strongly bonded assembly was obtained.

The excess aluminum adhering to the other portions of the plates than the side faces thereof as the bonding portions was removed by peeling after the cooling. All of these steps were carried out in the atmosphere. Also, in the course of the above process, the respective side faces as the bonding portions of the two alumina plates as the objects were kept submerged in the molten aluminum after they were first submerged therein until they were brought into contact with each other and no discontinuities of the molten aluminum as the bonding material were formed in the end faces until completion of the entire bonding process. This example corresponds to the third embodiment of the invention described hereinbefore with reference to FIGS. 3(a)–(d).

For confirmation, the bonded portions of the resultant bonded assembly was cut to reveal its section. Visual inspections of this section under an optical microscope as well as scanning electron microscope revealed very dense structure without voids therein.

EXAMPLE 4

As objects to be bonded together, one alumina plate having a thickness of 2 mm and dimensions of 100 mm×100 mm and three alumina plats having a thickness of 2 mm and dimensions of 10 mm×10 mm were prepared. Metal aluminum was employed as the bonding material. Then, this aluminum as the bonding material was charged into a melting basin and heated therein to 720° C. and maintained at this temperature so as to keep the material in the molten state thereof. Under this condition, the four alumina plates were submerged into the molten aluminum and under this submerged condition, a 2 mm width linear portion centering about a parallel line 25 mm distant from the edge and a corresponding portion one longitudinal side of each 10 mm×100 mm alumina plate were subjected, as the bonding portions, over the entire areas thereof to mechanical abrasion by a metal brush. Thereafter, still under the submerged condition, the abraded faces of the plates were moved closer to each other and eventually contacted each other. In this condition, the 100 mm×10 mm alumina plate and the 10 mm×100 mm alumina plates were disposed perpendicular to each other. While keeping this posture, the alumina plates were lifted up away from the molten aluminum and then allowed to be cooled naturally, whereby the aluminum was solidified and a strongly bonded assembly was obtained.

The excess aluminum adhering to the other portions of the plates than the side faces thereof as the bonding portions was removed by peeling after the cooling. All of these steps were carried out in the atmosphere. Also, in the course of the above process, the respective end faces as the bonding portions of the four alumina plates as the objects were kept submerged in the molten aluminum after they were first submerged therein until they were brought into contact with each other and no discontinuities of the molten aluminum as the bonding material were formed in the end faces until completion of the entire bonding process. This example corresponds to the fourth embodiment of the invention described hereinbefore with reference to FIGS. 4(a)–(c).

For confirmation, the bonded portions of the resultant bonded assembly was cut to reveal its section. Visual inspections of this section under an optical microscope as well as scanning electron microscope revealed very dense structure without voids therein.

EXAMPLE 5

As the objects to be bonded, two soda lime glass tubes having a wall thickness of 3 mm, an outer diameter of 30 mm, an inner diameter of 24 mm and a length of 100 mm were prepared. Of these two glass tubes, one of them had one end fused and sealed. As the bonding material, a tin alloy having a composition: Sn: 90.85%, Zn: 9%, Ti: 0.15%, was employed. In this, "%" denotes the percentage by weight.

The tin alloy as the bonding material was held within e.g. a melting basin 10 shown in FIG. 10 and heated and maintained at 250° C. to maintain the material in its molten state. Then, the two glass tubes were maintained with aligning the non-sealed end faces thereof to each other with a 0.2 mm gap between these end faces. The glass tubes were heated to 150° C. Into the 0.2 mm gap, the tin alloy molten in the melting basin 10 was fed via the pipe 11 having a rectangular metal plate 12 disposed at the leading end thereof to fill the gap 13 between the glass tubes so as to bond these glass tubes together. The metal plate 12 had a thickness of 0.15 mm and dimensions of 3 mm×10 mm. And, this plate was inserted from the leading end of the pipe 11 having an inner diameter of 3 mm and acting as an outlet for the molten tin alloy, with a portion of the plate projecting from the leading end of the pipe 11 by 3 mm. The metal plate 12 projecting from the leading end of the pipe 11 was inserted into the gap 13; then, the two glass tubes were rotated together without relative displacement therebetween while the molten tin alloy was fed with the end face of the pipe 11 kept in abutment against the glass tube surfaces, whereby the molten tin alloy was charged over the entire peripheries of the end faces of the glass tubes.

Thereafter, the assembly was cooled, when the gap was bonded and sealed by the tin alloy. In the course of the above, the metal plate 12 was slightly bent in advance so as to cause friction with the end faces of the glass tubes during the bonding process. The tin alloy fed in the above process was a portion thereof not contacting the atmosphere within the tin alloy melting basin 10, hence being devoid of oxides. The excess tin alloy adhering to the other portions of the tubes than the end faces thereof as the bonding portions was removed by peeling after the cooling. All of these steps were carried out in the atmosphere. Also, in the course of the above process, the respective end faces as the bonding portions of the two glass tubes as the objects were kept under the condition with the molten tin alloy being present therebetween after they were first brought contact with the alloy until the entire gap was filled with the molten tin alloy, so that no discontinuities of the molten tin alloy as the bonding material were formed in the end faces until completion of the entire bonding process. This example corresponds to the fifth embodiment of the invention described hereinbefore with reference to FIGS. 5(a)–(b).

On this bonded glass tube assembly, air was evacuated through its open end from the inside of the tube assembly and leakage from the bonded portion was checked with a helium leak detector. The result showed a leak amount less than $1 \times 10^{-11}$ (Pa·m³/s), indicating extremely good air-tight sealing condition of the glass tube bonded portion.

COMPARISON EXAMPLE 1

As objects to be bonded together, two plates of alumina each having a thickness of 1 mm and dimensions of 40 mm×50 mm were prepared. Metal aluminum was employed as the bonding material. Then, this aluminum as the bonding material was charged into a melting basin and heated therein to 720° C. and maintained at this temperature so as to keep the material in the molten state thereof. The two alumina plates were heated in advance to 700° C. Then, the molten aluminum as the bonding material was caused to flow onto the one side faces of the plates as their bonding portions. Thereafter, these side faces were abraded by the metal brush 5 over the entire areas thereof, so that a thin layer of the molten aluminum was formed extensively to adhere to each bonding face. Next, the plates under the heated condition were brought into contact with each other at the bonding portions or faces thereof and then cooled for solidifying the aluminum.

For confirmation, the bonded portions of the resultant bonded assembly was cut to reveal its section. Visual inspections of this section under an optical microscope as well as scanning electron microscope revealed presence of voids and different property portions therein.

As detailed above, the present invention proposes a method of bonding respective objects made of different kinds of material to each other, the method comprises the steps of:

(A) contacting a bonding material in the fluid state thereof with respective bonding faces of the respective objects to be bonded;

(B) mechanically abrading portions of the respective bonding faces contacting the bonding material to be bonded to each other;

(C) setting the respective objects fixed in a predetermined position relative to each other while maintaining the respective objects in contact with the bonding material in the fluid state thereof; and (D) solidifying the bonding material to bond the respective objects to each other;

characterized in that in the respective steps (A)–(D), the bonding material is present at the bonding portions to be bonded to each other of the respective objects constantly and without discontinuities.

Accordingly, it is possible to obtain a bonded assembly having superior bond strength and durability without voids in the bonded portion between the objects made of the two or three kinds of material. Moreover, it is also possible to obtain a bonded portion having a sealed portion with very high air-tightness in an efficient manner.

What is claimed is:

1. A method of bonding respective objects made of different kinds of material to each other, the method comprises the steps of:

(A) contacting a bonding material in the fluid state thereof with respective bonding faces of the respective objects to be bonded;

(B) mechanically abrading portions of the respective bonding faces contacting the bonding material to be bonded to each other;

(C) setting the respective objects fixed in a predetermined position relative to each other while maintaining the respective objects in contact with the bonding material in the fluid state thereof; and (D) solidifying the bonding material to bond the respective objects to each other;

wherein in the respective steps (A)–(D), the bonding material is present at the bonding portions to be bonded to each other of the respective objects constantly and without discontinuities.

2. The method according to claim 1, wherein the bonding material in the fluid state thereof comprises a molten metal, which includes a contact portion to be contacted to the atmosphere and a non-contact portion not to be contacted to the atmosphere, the non-contact portion of the molten metal being placed into contact with the portions to be bonded to eacch other of the respective objects.

3. The method according to claim 1, wherein said steps are effected at one time.

4. The method according to claim 2, wherein said steps are effected at one time.

5. The method according to claim 1, wherein at least one of the different kinds of material forming the respective objects is a non-metal material.

6. The method according to claim 2, wherein at least one of the different kinds of material forming the respective objects is a non-metal material.

* * * * *